(12) United States Patent
Ramana Reddy et al.

(10) Patent No.: US 12,333,034 B2
(45) Date of Patent: Jun. 17, 2025

(54) SECURE EMBEDDED WEB BROWSER

(71) Applicant: Intuit Inc., Mountain View, CA (US)

(72) Inventors: K Venkat Ramana Reddy, Bangalore (IN); Senthilvel R, Bangalore (IN); Sundip Sharma, Bangalore (IN)

(73) Assignee: Intuit Inc., Mountain View, CA (US)

(*) Notice: Subject to any disclaimer, the term of this patent is extended or adjusted under 35 U.S.C. 154(b) by 55 days.

(21) Appl. No.: 17/875,045

(22) Filed: Jul. 27, 2022

(65) Prior Publication Data
US 2023/0367892 A1 Nov. 16, 2023

(51) Int. Cl.
*H04L 29/06* (2006.01)
*G06F 9/54* (2006.01)
*G06F 21/62* (2013.01)

(52) U.S. Cl.
CPC .......... *G06F 21/6218* (2013.01); *G06F 9/542* (2013.01)

(58) Field of Classification Search
CPC .............................. G06F 21/6218; G06F 9/542
USPC ......................................................... 726/17
See application file for complete search history.

(56) References Cited

U.S. PATENT DOCUMENTS

| | | | | |
|---|---|---|---|---|
| 2004/0078422 A1* | 4/2004 | Toomey | .............. | G06F 21/6218 709/202 |
| 2009/0125986 A1* | 5/2009 | Kiester | .................. | G06F 21/31 726/4 |
| 2009/0319782 A1* | 12/2009 | Lee | .......... | G06F 21/34 713/172 |
| 2010/0064299 A1* | 3/2010 | Kacin | ....................... | G06F 9/54 719/328 |
| 2012/0168494 A1* | 7/2012 | Kim | ........................ | H04L 67/02 235/375 |

(Continued)

FOREIGN PATENT DOCUMENTS

| CN | 103064738 A | * | 4/2013 | |
|---|---|---|---|---|
| CN | 105144216 A | * | 12/2015 | ............. G06Q 20/20 |
| CN | 106850545 A | * | 6/2017 | ............. G06F 21/45 |
| CN | 108932651 A | * | 12/2018 | ......... G06Q 30/0635 |

(Continued)

OTHER PUBLICATIONS

Kirkham, Tom, Sandra Winfield, Serge Ravet, and Sampo Kellomäki. "The personal data store approach to personal data security." IEEE security & privacy 11, No. 5 (2012): 12-19. (Year: 2012).*

(Continued)

*Primary Examiner* — Luu T Pham
*Assistant Examiner* — Walter J Malinowski
(74) *Attorney, Agent, or Firm* — Lathrop GPM LLP

(57) ABSTRACT

A method including receiving, at an embedded browser embedded in an application, a request to access data designated by a uniform resource locator (URL) specified by the request. The method also includes intercepting, by a method interceptor, an application programming interface (API) call to access the data designated by the URL. Intercepting is performed prior to execution of the API call. The API call is performable by an API of the embedded browser. The method also includes comparing, by the method interceptor, a domain specified by the URL to an list of allowed domains. The method also includes blocking, by the method interceptor and responsive to the domain failing to be a member of the list of allowed domains, the API call. Blocking is performed by the method interceptor preventing the API call from passing to the API.

17 Claims, 10 Drawing Sheets

(56) References Cited

U.S. PATENT DOCUMENTS

| | | | | |
|---|---|---|---|---|
| 2015/0163116 | A1* | 6/2015 | Ding | H04L 67/535 |
| | | | | 709/224 |
| 2019/0005031 | A1* | 1/2019 | Kataria | G06F 16/93 |
| 2019/0318079 | A1* | 10/2019 | Sandoval | G06F 21/52 |
| 2019/0342315 | A1* | 11/2019 | Smelov | H04L 43/06 |
| 2020/0097337 | A1* | 3/2020 | Borkar | H04L 67/02 |
| 2020/0145384 | A1* | 5/2020 | Chauhan | G06F 16/95 |
| 2021/0377252 | A1* | 12/2021 | Monro | H04L 63/0884 |
| 2021/0390486 | A1* | 12/2021 | Chu | G06F 9/451 |
| 2021/0400075 | A1* | 12/2021 | Stergioudis | H04L 63/1433 |
| 2023/0367833 | A1* | 11/2023 | Kol | G06F 16/9566 |

FOREIGN PATENT DOCUMENTS

| | | | | | |
|---|---|---|---|---|---|
| CN | 114270907 | A | * | 4/2022 | G01S 11/06 |
| CN | 114741628 | A | * | 7/2022 | |
| TW | 202029036 | A | * | 8/2020 | |
| WO | WO-2004075466 | A2 | * | 9/2004 | G06F 16/24575 |

OTHER PUBLICATIONS

Wang, Chih-Hung, and Yi-Shauin Zhou. "A new cross-site scripting detection mechanism integrated with HTML5 and CORS properties by using browser extensions." In 2016 International Computer Symposium (ICS), pp. 264-269. IEEE, 2016. (Year: 2016).*

Talkington, Josh, Kirill Morozov, and Ram Dantu. "Why Protocols Fail to Transition to Mobile Domains." In 2020 Sixth International Conference on Mobile And Secure Services (MobiSecServ), pp. 1-12. IEEE, 2020. (Year: 2020).*

* cited by examiner

Consuming CefBrowser through builder
↙ 800

Create a builder class instance  ······  `AppShellBrowserBuilder builder;`
802

Add required arguments to customize browser to your needs  ······
```
builder.SetStringArgument("url", url)
    .SetStringArgument("postData", postData)
    .SetStringArgument("modal", "y")
    .SetStringArgument("showtoolbar", "n")
    .SetStringArgument("HideURL", "y")
    .SetStringArgument("WIDTH", "1000")
    .SetStringArgument("HEIGHT", "888");
```

Conditionally add required callback method / data object if required  ······
```
if (pSubEdit)
{
    m_pSubTag = pSubEdit;
    APPSHELL_BROWSER_CALLBACK proc =
    (APPSHELL_BROWSER_CALLBACK)browserProc;
    builder.RegisterBrowserCallback(proc)
        .SetRefCon((OBDDataTypes::QBLONG_PTR)pSubEdit);
}
```

Call launch from builder  ······  `builder.LaunchBrowser();`

SECURE EMBEDDED WEB BROWSER

CROSS-REFERENCE TO RELATED APPLICATIONS

This application claims priority to Indian provisional patent application number 202241027648, filed May 13, 2022, the entirety of which is hereby incorporated by reference.

BACKGROUND

In computer science, a browser or web browser is a type of software application or application-specific hardware that is used to display information, and to serve as a graphical user interface (GUI) that allows interaction with a user. For example, a browser may receive a network address, access network resources identified by the network address, and provide information retrieved from the network resources.

An embedded browser is a type of browser. An embedded browser is a browser contained within another application, or is built for a specific purpose and runs in an embedded system.

SUMMARY

The one or more embodiments provide for a method. The method includes receiving, at an embedded browser embedded in an application, a request to access data designated by a uniform resource locator (URL) specified by the request. The method also includes intercepting, by a method interceptor, an application programming interface (API) call to access the data designated by the URL. Intercepting is performed prior to execution of the API call. The API call is performable by an API of the embedded browser. The method also includes comparing, by the method interceptor, a domain specified by the URL to an list of allowed domains. The method also includes blocking, by the method interceptor and responsive to the domain failing to be a member of the list of allowed domains, the API call. Blocking is performed by the method interceptor preventing the API call from passing to the API.

The one or more embodiments provide for another method. The method includes method includes receiving, at an embedded browser embedded in an application, a request to access data designated by a uniform resource locator (URL) specified by the request. The method also includes intercepting, by a method interceptor, an application programming interface (API) call to access the data designated by the URL. Intercepting is performed prior to execution of the API call. The API call is performable by an API of the embedded browser. The method also includes comparing, by the method interceptor, a domain specified by the URL to an list of allowed domains. The method also includes passing, by the method interceptor and responsive to the domain being a member of the list of allowed domains, the API call to the API.

The one or more embodiments also provide for a system. The system includes a processor and a data repository in communication with the processor. The data repository stores data and a request received from an external computing device. The data repository also stores a uniform resource locator (URL) specified by the request. The data repository also stores a domain of the URL. The data repository also stores an application programming interface (API) call. The data repository also stores an list of allowed domains. The system also includes an application executable by the processor. The system also includes an embedded browser embedded in the application. The embedded browser is configured to receive the request to access the data designated by the URL. The embedded browser includes an API programmed to execute the API call or pass the API call to the application. The embedded browser also includes a method interceptor programmed to intercept the API call prior to executing the API call or passing the API call to the application. The method interceptor is also programmed to compare the domain to the list of allowed domains. The method interceptor is also programmed to block, responsive to the domain failing to be a member of the list of allowed domains, the API call from executing or from passing to the application.

Other aspects will be apparent from the following description and the appended claims.

BRIEF DESCRIPTION OF DRAWINGS

FIG. 3, FIG. 4, FIG. 5, FIG. 6, FIG. 7, FIG. 8, and FIG. 9 show an example, in accordance with one or more embodiments.

Like elements in the various figures are denoted by like reference numerals for consistency.

DETAILED DESCRIPTION

In general, the one or more embodiments relate to security improvements for an embedded browser. An embedded browser is a browser that that is contained in, or is specifically programmed to interact with, a host application (or simply the "application.") An embedded browser may have certain advantages when used in conjunction with controlling the application in which the browser is embedded. The advantages may include customized interactions between the browser and application, improved in-product experience, two-way communication, and other benefits.

However, embedded browsers may be vulnerable to certain types of malicious online activity commonly known as "hacking." For example, when using an existing web browser as an embedded browser, multiple data channels in an embedded browser may be exposed to web pages. The exposure might allow a malicious user to gain illegitimate access to sensitive information to which the application has access or which the application displays.

The one or more embodiments address the problem of malicious online activity with respect to embedded browsers. In particular, the one or more embodiments establish boundaries for data object access, links, and downloads through the embedded browser by using a method interceptor. The method interceptor is computer code or application-specific hardware programmed to intercept calls for a method or property in the embedded browser or the application in which the browser is embedded. In particular, the method interceptor is programmed to perform the methods described with respect to FIG. 2A and FIG. 2B, or the examples of FIG. 3 through FIG. 9, described below. The method interceptor uses a secure domain list which whitelists allowed accessing websites. A whitelist of allowed domains may be used to prevent non-authorized domains from accessing application data via the embedded browser.

As an alternative, a blacklist of disallowed domains may be used. For example, requests are allowed unless the requested domain is on the blacklist.

As yet another alternative, a combination of a whitelist and a blacklist may be used. For example, a whitelist may allow requests with whitelisted domains to process more quickly or without additional security checks (password, security certificates, etc.), but only blacklisted domains are blocked automatically. Other examples of the uses of whitelists and blacklists are possible.

The method interceptor may have additional security features. For example, the method interceptor may disable local pages for ActiveX object access by default. The method interceptor may use a flag to bypass checks for local, trusted plugin developments. The one or more embodiments may track domains across multiple page redirects in order to determine which domains may be associated with malicious users.

Figure 1:
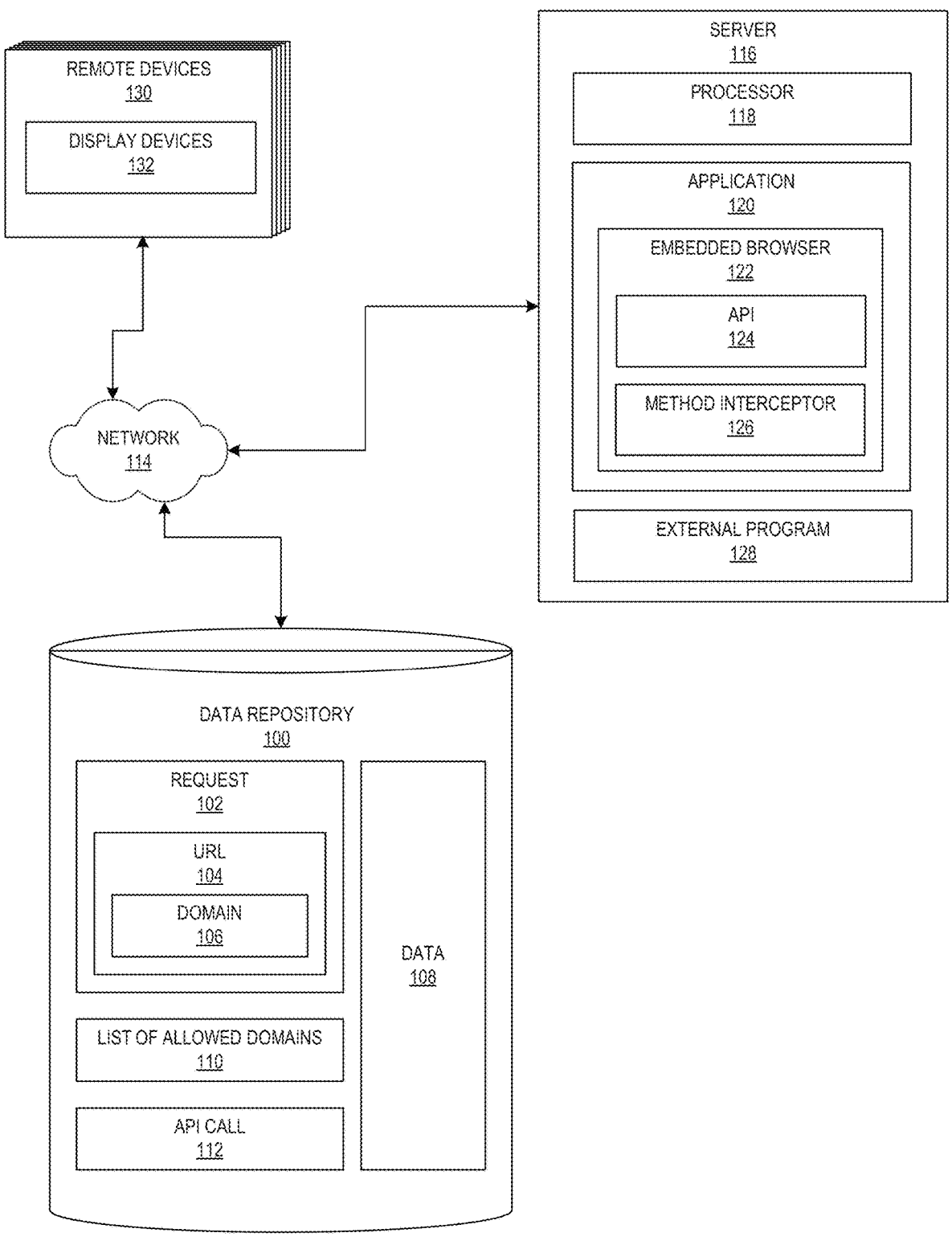
FIG. 1 shows a computing system for securing an embedded browser, in accordance with one or more embodiments.

Attention is now turned to the Figures. FIG. 1 shows a computing system for securing an embedded browser, in accordance with one or more embodiments.

The system shown in FIG. 1 includes a data repository (100). The data repository (100) is a non-transitory computer readable storage medium in some embodiments. The data repository (100) is any type of storage unit or device (e.g., a file system, database, collection of tables, or any other storage mechanism) for storing data. Further, the data repository (100) may include multiple different storage units or devices. The multiple different storage units or devices may or may not be of the same type or located at the same physical site.

The data repository (100) stores a request (102). The request (102) is a command or request to execute a function of an application or an embedded browser within the application. For example, the request (102) may be a request for data (108), defined below. However, the request may be to execute a function at the server, defined below. The request (102) may be received from remote devices, as defined below, or may be received from additional applications executed by the server that executes the application in which the embedded browser is embedded.

The request (102) may include a number of elements. For example, the request (102) may include a URL (104). The term "URL" means "Uniform Resource Link." The URL (104) is a sequence of characters that identifies a website or a computer which is to send or receive the data (108). The URL (104) also includes a means of locating and accessing the website or the computer that is to send or receive the data (108). The URL (104) may include a Uniform Resource Identifier (URI) in some embodiments. A URI is an identifier which may, or may not, include the means for locating and accessing. The URL (104) may take other forms, such as a Uniform Resource Name (URN), which is a URI that identifies a resource by name in a particular namespace.

The URL (104) may designate or include a domain (106). A domain is a string of characters that identifies a realm of administrative autonomy, authority, or control within a network such as the Internet. The domain (106) identifies a network domain or an internet protocol (IP) resource, such as a server or personal computer used to access the network. The domain (106) may be used to identify services provided through the network, such as websites and email services. Examples of the domain (106) include top level domains (e.g., ".com," ".info," ".edu," ".org," etc.), country-code top level domains (".UK," ".AU," etc.), and second-level domain names, and third level domains names that may be open for reservation by end-users who which to connect local networks to the Internet, create other publicly available Internet resources, or run websites.

The domain (106) serves to identify Internet resources, such as computers, networks, and services, with a text-based label that is easier for a human to memorize than the numerical addresses used in the Internet protocols. The domain (106) may represent entire collections of such resources or individual instances. Individual Internet host computers may use domain names as host identifiers, also called hostnames.

The data repository (100) also stores data (108). The data (108) is data accessible by an application or by the embedded browser, as defined below. The data (108) may be sensitive, and thus should only be exposed to the computing device of the authorized end user or remain within the control of the service provider which maintains the data (108). A malicious user may wish to gain access to the data (108) for fraudulent purposes.

For example, the data (108) may be financial information of an end user. The financial information may be maintained by a company that provides financial management software for use by the end user. The financial management software may use and manipulate the data (108) in a manner that the end user desires, and then present the manipulated data (108) to the end user. A malicious user may wish to access the financial data of the end user in order to steal or defraud the end user, the company that provides the financial management software, or for other nefarious purposes.

The data repository (100) also stores a list of allowed domains (110). The list of allowed domains (110) may also be referred to as a "whitelist." The list of allowed domains (110) is a list of domains that are permitted access to the data (108). If the domain (106) of the URL (104) in the request (102) is not a member of the list of allowed domains (110), then the request (102) may be blocked in the manner described with respect to the method of FIG. 2A. Alternatively, if the domain (106) of the URL (104) in the request (102) is a member of the list of allowed domains (110), then the request (102) may be honored in the manner described with respect to the method of FIG. 2B.

The data repository (100) also stores a API call (112). The API call (112) is a command by an application programming interface (API) to cause an embedded browser, application, or some other program to execute a software function.

The system shown in FIG. 1 may include other components. For example, the system may include or may have access to, a network (114). The network (114) is one or more computing systems or computer hardware or software components which communicate with each other, possibly indirectly over a chain of communications among multiple computers. An example of the network (114) is the Internet. Another example of the network (114) is described with respect to FIG. 10A and FIG. 10B.

The system shown in FIG. 1 includes a server (116). The server (116) is a computing device that executes, hosts, or controls other the one or more embodiments.

The server (116) includes a processor (118). The processor (118) is one or more hardware processors or virtual machines, possibly operating in a distributed computing environment. An example of a processor is described with respect to FIG. 10A and FIG. 10B.

The server (116) also hosts an application (120). The application (120) is software or application-specific hardware configured to perform one or more functions when executed by the processor (118). An example of the application (120) is financial management software which uses or manipulates the data (108). However, the application (120) may be many different types of applications, such as an application for storing and manipulating health-related data, manipulating scientific data, and possibly many others. Thus, the one or more embodiments are not necessarily directed to a computerized financial management tool, but rather reflect an improvement to computer security or network security in order to secure the data (108) when stored in the data repository (100) and used by the application (120) or the embedded browser (122).

The embedded browser (122) is a browser that is contained in the application (120). "Contained in" means that the embedded browser (122) is part of the computer code that defines the application (120), is a plug-in to the embedded browser (122), or is otherwise specifically designed to interact with the application (120). The embedded browser (122) may be used to access or display the data (108), and may also be involved in manipulating the data (108). The embedded browser (122) may be presented as a graphical user interface (GUI) one on or more display devices of one or more remote devices, such as the remote devices (130) and display devices (132) defined below.

The embedded browser (122) may be subject to a variety of vulnerabilities, of which a malicious user may take advantage in order to gain illicit access to the data (108). For example, an ActiveX object call by the embedded browser (122) may be intercepted by a malicious user in order to gain access to viewing the data (108). In other examples, object tag bindings or links available in the embedded browser (122) may be manipulated in order to gain illicit access to the embedded browser (122). Without security, access to the data (108) via the embedded browser (122) may allow a malicious user to write over data or directly copy data or add their own data (e.g., a virus, Trojan, etc.). Without security, the embedded browser (122) may be unable to control application programming interface usage, or may have no restrictions on how files may be downloaded via the embedded browser (122).

The one or more embodiments address these and other technical security issues in a computer environment. For example, the method interceptor (126) defined below may be used as described with respect to FIG. 2 to allow only whitelisted domains to access the data (108) via the embedded browser (122).

The embedded browser (122) includes one or more application programming interfaces (APIs), such as the API (124) shown in FIG. 1. The API (124) is computer code that permits or assists two or more other computer programs to communicate. Thus, the API (124) may be characterized as a type of software interface that offers a service to other software components. A document or standard that describes how to build or use such a connection or interface is called an API specification. A computer system that meets the standard is said to implement or expose an API. The term API may refer either to the specification or to the implementation of the software interface.

In the one or more embodiments, the API (124) serves as an interface between the embedded browser (122) and the application (120). However, the API (124) may also interface with other programs, such as but not limited to the external program (128) defined below.

The embedded browser (122) also includes a method interceptor (126). The method interceptor (126) is computer code or application-specific hardware programmed to intercept calls for a method or property in the embedded browser (122) or the application in which the browser is embedded.

Figure 2A:
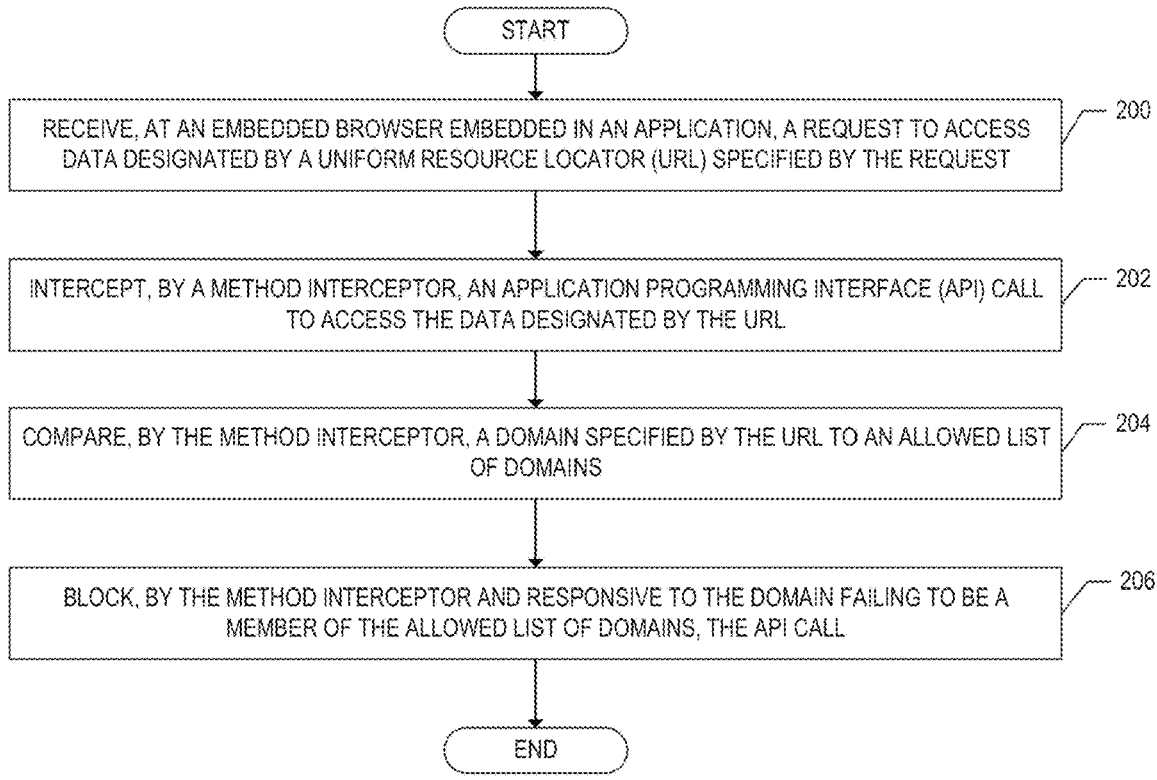
FIG. 2A and FIG. 2B show methods of securing an embedded browser, in accordance with one or more embodiments.
Figure 2B:
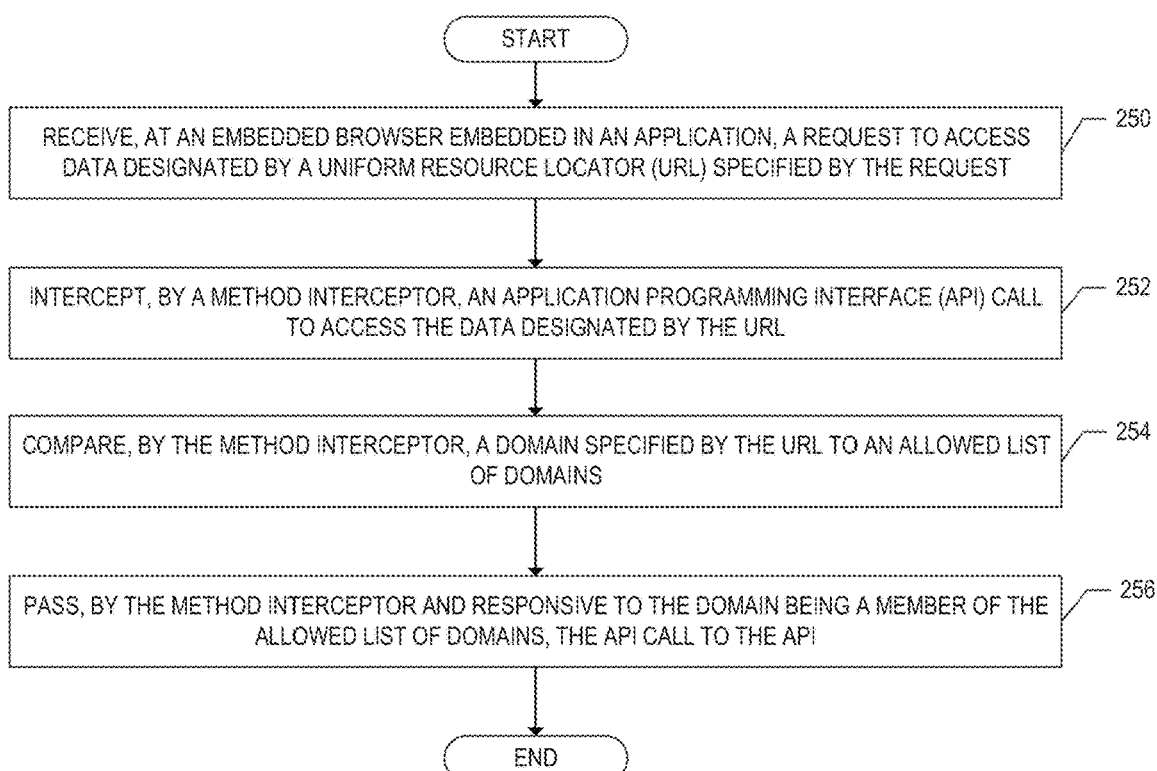

The method interceptor (126) may also be described as computer code or application-specific hardware programmed to perform the methods described with respect to FIG. 2A and FIG. 2B, or the examples of FIG. 3 through FIG. 9.

The method interceptor (126) may be a plugin of the embedded browser. A plugin is a software component that adds a specific feature to an existing computer program. When a program supports plugins, the program enables customization. Thus, if the method interceptor (126) is a plugin, then the method interceptor (126) may be added to an existing program in order to enhance the security of the program.

However, the method interceptor (126) need not be a plugin. The method interceptor (126) may be an integrated software component of the embedded browser (122).

Details regarding the operation of the method interceptor (126) are described with respect to FIG. 2A and FIG. 2B. However, briefly, the method interceptor (126) is configured to intercept an API call from the application (120) or the embedded browser (122). The method interceptor (126) may then compare a target domain specified in the API call to a whitelist of allowed domains. An advantage to the one or more embodiments over the ordinary use of whitelists is that the API call is intercepted at the embedded browser (122), rather than the domain specified in the request (102). As a result, it is not possible for a user to be tricked into accidentally giving away information to a target domain specified by a malicious user. Another advantage to the one or more embodiments over the ordinary use of whitelists is that the one or more embodiments permits developers to open external pages, but users may be assured that the developers cannot access users' data.

The server (116) may include other hardware or software components. For example, the server (116) may host an external program (128). The external program (128) is computer code or application-specific hardware that is defined separately from the application (120). The external program (128) may communicate with the application (120), but not with the embedded browser (122), or vice versa. In some embodiments the external program (128) may be executed on remote servers (i.e., not the server (116)) or one or more of the remote devices (130), communicating via the network (114).

A non-limiting example of the external program (128) may be a machine learning model which communicates with the application (120) in order to return manipulated data. In a specific example, the application (120) may be financial management software, and the external program (128) is a supervised or unsupervised machine learning model that finds hidden relationships in the data (108) that may be of interest to an end user. The application (120) may call the external program (128) to perform the analysis of the data (108), and then output the result to the application (120). The output is then provided to the embedded browser (122), which formats the output into a human-readable form and causes the output to be displayed on a GUI, such as the display devices (132) of the remote devices (130).

The remote devices (130), in turn, are one or more remote computing devices. The remote devices (130) may be, for example, the computers, mobile phones, tablets, etc. of end users of the application (120). The remote devices (130) may also be servers, which may be third party servers.

In either case, the display devices (132) of the remote devices (130) are monitors, televisions, screens, etc. which may display the GUI generated by the embedded browser (122) of the application (120). In an embodiment, the server (116) may also be in communication with one or more display devices, other than the display devices (132).

While FIG. 1 shows a configuration of components, other configurations may be used without departing from the scope. For example, various components may be combined to create a single component. As another example, the functionality performed by a single component may be performed by two or more components.

FIG. 2A shows a method of securing an embedded browser, in accordance with one or more embodiments. FIG. 2B shows a method of permitting an API call by an embedded browser, in accordance with one or more embodiments. The methods of FIG. 2A and FIG. 2B may be executed by the system shown in FIG. 1, possibly using components from the computing system and network environment disclosed with respect to FIG. 10A and FIG. 10B.

Step 200 includes receiving, at an embedded browser embedded in an application, a request to access data designated by a uniform resource locator (URL) specified by the request. The request may be received from a variety of different sources via wired, wireless, or networked communications. For example, the request may be received from one or more of the remote devices (130). The request may also be received from an external program (128). The request may include a URL that specifies the location of data, or the location to which the data should be transmitted. The URL in the received request may specify a domain.

Step 202 includes intercepting, by a method interceptor, an application programming interface (API) call to access the data designated by the URL. Intercepting is performed prior to the execution of an API call. The API call is performable by an API of the embedded browser.

Intercepting may be performed by programming the method interceptor to receive the API call, or to program the embedded browser to route all API call requests to the interceptor. The method interceptor, in turn, is programmed to perform the following step.

Step 204 includes comparing, by the method interceptor, a domain specified by the URL to a list of allowed domains. Comparing may be performed by checking to see if the domain specified by the URL is a member of the list. If not, then the check fails. If so, then the check passes.

The list may be updated from time to time to include more or fewer entries. The list may be pre-populated by a programmer or may be automatically maintained by using security certificates, encryption keys, etc. to verify which domains should be allowed access to the API of the embedded browser (122).

Step 206 includes blocking, by the method interceptor and responsive to the domain failing to be a member of the list of allowed domains, the API call. Blocking is performed by the method interceptor preventing the API call from passing to the API. Blocking may also be performed by returning the API call to another program that attempts to isolate the source of the request in order to take additional security actions with respect to the domain contained within the request. For example, a blacklisted domain may be blocked by anti-virus software executing on the server (116) before the request is passed to the application (120) or the embedded browser (122). In one embodiment, the method of FIG. 2A may terminate thereafter.

The method of FIG. 2A may be extended or modified. For example, the method may also include allowing other requests to proceed. In a specific example, the method of FIG. 2A may also include receiving, at the embedded browser, a second request to access second data designated by a second URL specified in the second request. In this case, the method also includes intercepting, by the method interceptor, a second API call to access the second data designated by the second URL. The method then also further includes comparing, by the method interceptor, a second domain specified by the second URL to the list of allowed domains. The method then also includes passing, by the method interceptor and responsive to the second domain being a member of the list of allowed domains, the second API call to the API.

Subsequently, the program or method of the application (120) or the embedded browser (122) of FIG. 1 called by the API may be executed as requested in the request. For example, the method of FIG. 2A may also include executing, by the API, the second API call; retrieving, by the embedded browser, the second data; and returning, by the embedded browser, the second data. In a more specific example, financial data specified in the request with a whitelisted domain may be retrieved, manipulated as desired, and then presented to a user of a remote device.

Thus, for example, the method of FIG. 2A may also include calling, by the API and responsive to passing the second API call, execution of the application. The application generates an output using the data designated by the URL. The output may then be displayed on a display screen in communication with the embedded browser. Alternatively, or in addition, the output may be transmitted via the embedded browser to an external program external to the embedded browser and external to the application.

The method of FIG. 2A may also include registering a page load event to track the URL. A page load event is a request or a fulfilled request to load a page on the embedded browser. Registering may include tracking the page load event or adding a page load event to a list of actions in the request to be checked by the method interceptor.

Thus, the one or more embodiments provide for a method that increases security for an embedded browser. When a requested page is loaded, the URL in the request is identified and the domain in the request is stored. When the page makes an API call to access data through a program such as JAVASCRIPT®, the API call is intercepted using the custom method interceptor. The method interceptor checks the domain in the request. If the domain is in the allowed list, then the API call is honored. Otherwise, the call is returned (not fulfilled and not passed). The domain name list is dynamically configurable through a distributed computing environment (DCE).

Attention is now turned to FIG. 2B. As indicated above, FIG. 2B is a flowchart of a method permitting an API call by an embedded browser, in accordance with one or more embodiments.

Step 250 includes receiving, at an embedded browser embedded in an application, a request to access data designated by a uniform resource locator (URL) specified by the request. Receiving may be performed as described with respect to step 200 of FIG. 2A.

Step 252 includes intercepting, by a method interceptor, an application programming interface (API) call to access the data designated by the URL. Intercepting is performed prior to execution of the API call. The API call is performable by an API of the embedded browser. Intercepting may be performed as described with respect to step 202 of FIG. 2A.

Step 254 includes comparing, by the method interceptor, a domain specified by the URL to a list of allowed domains. Comparing may be performed as described with respect to step 204 of FIG. 2A.

Step 256 includes passing, by the method interceptor and responsive to the domain being a member of the list of allowed domains, the API call to the API. Passing may be performed by transmitting the API call from the method interceptor to the API of the embedded browser or to the application that hosts the embedded browser. Passing also may be performed by permitting the API to complete a call already sent to the API but paused as a result of a command from the method interceptor.

The method of FIG. 2B may be varied. For example, the method of FIG. 2B may block another API call that would have been called as a result of a second received request. Blocking may be performed as described with respect to the method of FIG. 2A.

The method of FIG. 2B may be still further varied, such as the other variations described above with respect to FIG. 2A. Thus, the one or more embodiments are not necessarily limited by the examples described with respect to FIG. 2B.

While the various steps in this flowchart are presented and described sequentially, at least some of the steps may be executed in different orders, may be combined or omitted, and at least some of the steps may be executed in parallel. Furthermore, the steps may be performed actively or passively.

FIG. 3 through FIG. 9 show an example of a secure browser and an example method for securing the same. The examples of FIG. 3 through FIG. 9 may be implemented using one or both of the system of FIG. 1 and the methods of FIG. 2A and FIG. 2B. The examples described herein are for explanatory purposes only and not intended to limit the scope. The following example is for explanatory purposes only and not intended to limit the scope.

Figure 3:
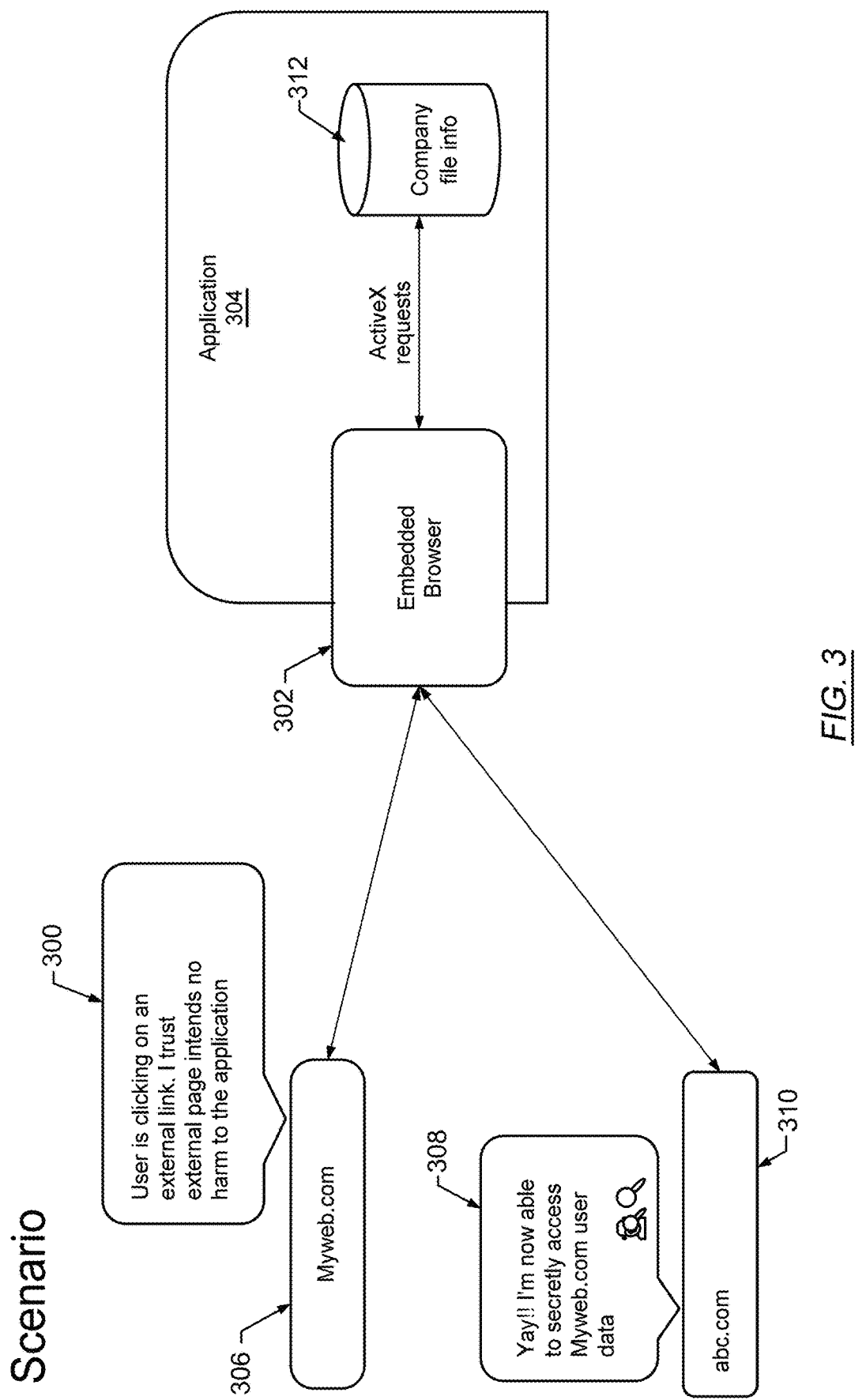

FIG. 3 illustrates technical security problems that arise when an embedded browser is not secured. In the example of FIG. 3, a legitimate user (300) is using an embedded browser (302) of an application (304). The legitimate user (300) may not know that the embedded browser (302) is embedded in the application (304), or the legitimate user (300) may simply desire to use the embedded browser (302) to access websites external to the application (304).

Thus, the legitimate user (300) clicks on or otherwise activates an external link (306), "Myweb.com." The legitimate user (300) believes that the Web page activated by the external link (external link (306)) will cause no harm to the application (304) or to the other interests of the legitimate user (300). For example, the legitimate user (300) may have been tricked into believing that "Myweb.com" is the ordinary link used by the application (304).

However, a malicious user (308) has changed the code in the external link (306). Thus, when the external link (306) is called by the embedded browser (302), the malicious user (308) at the domain (310), "abc.com," is able to secretly access the sensitive data (312). The malicious user (308) may copy the output of the embedded browser (302) to the domain (310), or the malicious user (308) may see a mirror image of the GUI which the legitimate user (300) sees. In any case, the malicious user (308) at domain (310) steals the sensitive data (312) for fraudulent purposes.

The security vulnerability described above is insidious, because the legitimate user (300) may be unable to discern that a security breach has occurred. The legitimate user (300) may allow the malicious user (308) to continue to steal the sensitive data (312) for long periods of time, perhaps indefinitely, because the legitimate user (300) is unaware of the malicious activity.

The scenario described above is a third party web page vulnerability. Other third party websites can also be used to access the sensitive information in a manner similar to that described above.

Additionally, the embedded browser (302) may be exposed to other security vulnerabilities. For example, a security vulnerability may be exposed with respect to a local HTML (Hypertext Markup Language) file used by the embedded browser (302). When the embedded browser (302) is launched, the embedded browser (302) is allowed to read the sensitive information (312) (e.g., bank account numbers, routing numbers, etc.) However, the embedded browser (302) may allow local HTML files to be opened. As a result, the application (304) hosting the embedded browser (302) may allow multiple users to use the sensitive data (312). Thus, a user's system is allowed to be used by users other than an administrator, such as the malicious user (308). Accordingly, a non-administrator, such as the malicious user (308), can modify a local HTML file at the domain (310) to read the sensitive information (312) via the embedded browser (302), even if ostensibly not permitted.

Figure 4:
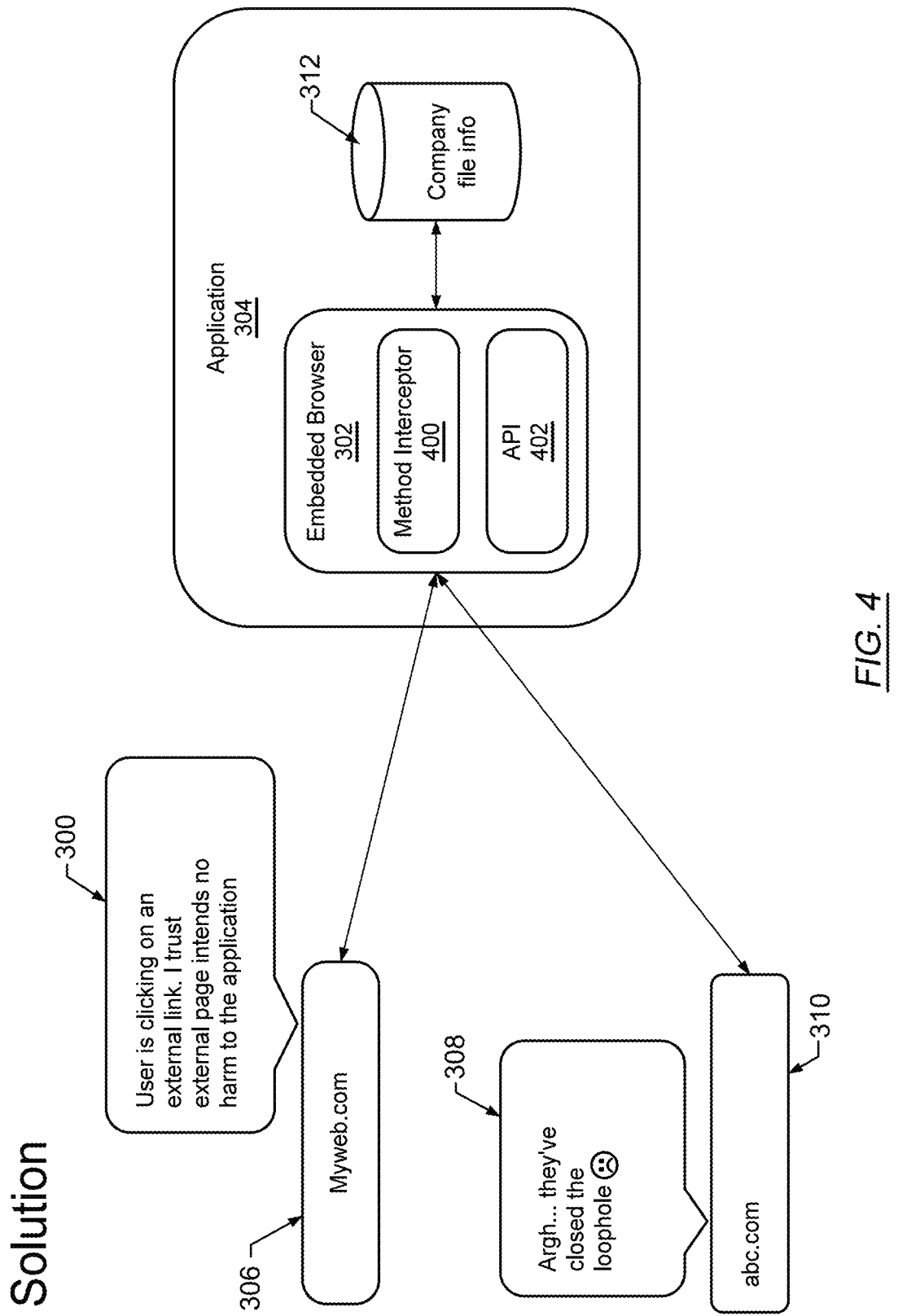

FIG. 4 illustrates the effect of the technical solutions described herein. FIG. 4 uses reference numerals mentioned with respect to FIG. 3. Reference numerals common to FIG. 3 and FIG. 4 refer to similar components described with respect to FIG. 3 and have similar definitions.

Again, the legitimate user (300) clicks on the compromised external link (306) to "Myweb.com," which the malicious user (308) has tricked the legitimate user (300) into using. However, now the embedded browser (302) includes a method interceptor (400) (e.g., the method interceptor (126) described with respect to FIG. 2, which operates according to the methods of FIG. 2A and FIG. 2B).

The method interceptor (400) intercepts the API call by the API (402) requested by the malicious user (308). The method interceptor (400) compares the domain (310) "abc.com" to a whitelist of allowed domains. Here, the sole allowed domain is "Myweb.com." Because the domain (310) is not on the whitelist (i.e., "abc.com" does not match "Myweb.com"), the method interceptor (400) blocks the API call from the API (402). As a result, the malicious user (308) is denied access to the sensitive data (312).

Optionally, the embedded browser (302) may be programmed to communicate a warning to the legitimate user (300) that a malicious attempt has been made to access the sensitive data (312). The legitimate user (300) may be prompted to take additional security actions, such as to run a virus scan, to change passwords, to purge caches, to request a security update from the legitimate domain of "Myweb.com", or many other possible actions.

Figure 5:
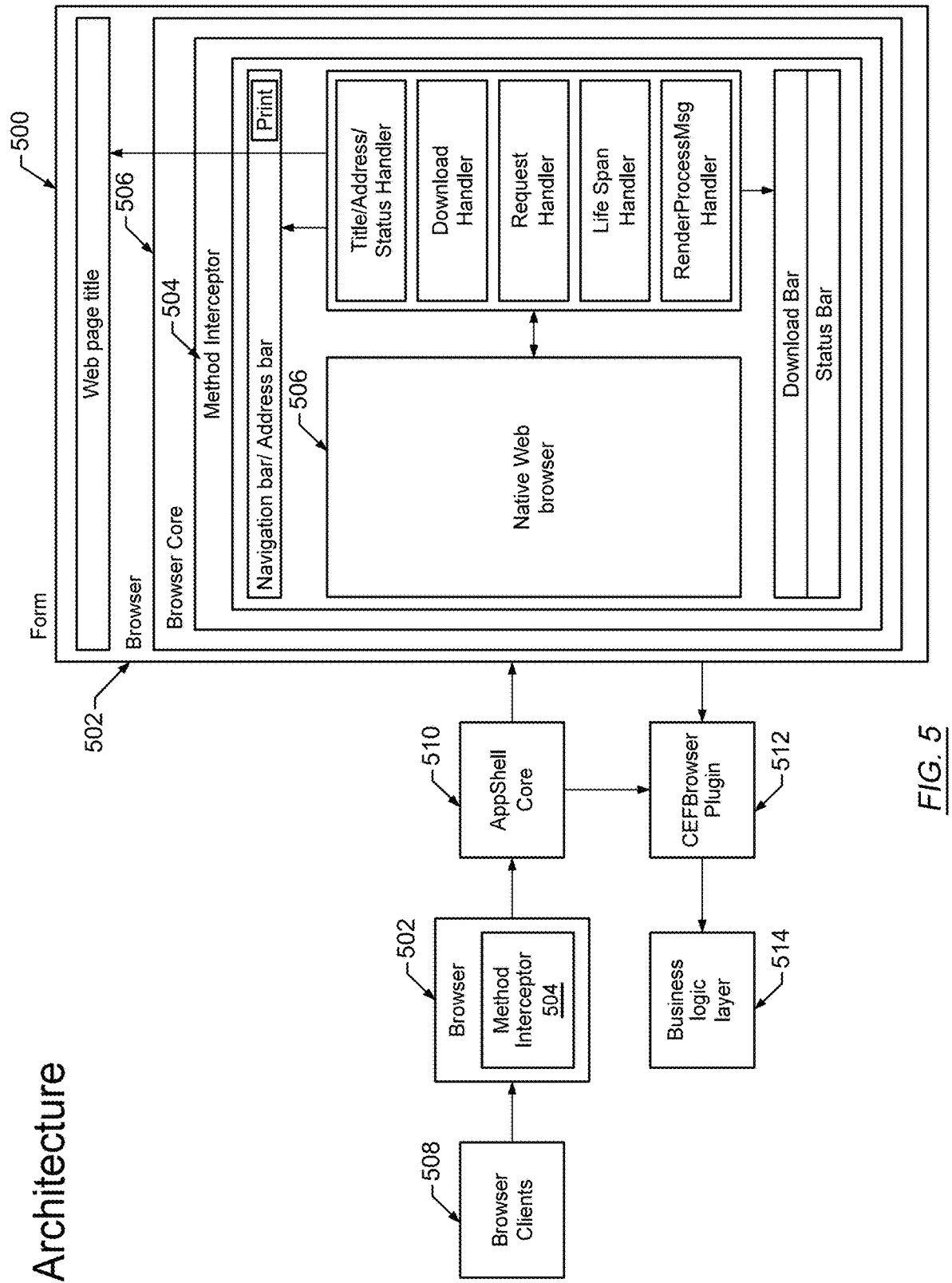

FIG. 5 shows an architecture for a secure embedded web browser as described above with respect to FIG. 1 through FIG. 2B. An application (500), such as the application (120) of FIG. 1, may generate a form. The form is displayed and manipulated in an embedded web browser (502). The method interceptor (504) includes a method interceptor (504), such as the method interceptor (126) of FIG. 1.

The method interceptor (504) is programmed as a plugin adapter to a browser core of the native web browser (506). The native web browser (506) may be a Chromium embedded framework (CEF) browser. Programmatically, the method interceptor (504) acts as a layer inside of which is the native web browser (506) and other aspects of the embedded web browser (502) as shown. The other aspects may include a title, address, and status handler, a web title page bar, a download handler, a request handler, a life span handler, a render process message handler, a download bar, a status bar, etc. Thus, any calls to the embedded web browser (502) are first checked by the method interceptor (504).

The process described with respect to FIG. 2A and FIG. 2B is shown to the left of the architecture shown in the embedded web browser (502). Browser clients (508) attempt to access and use the embedded web browser (502), which includes the method interceptor (504). The request attempts to access the functions of the application shell core (510), which represents the native web browser (506). The request is intercepted by the method interceptor (504), which may be a Chromium embedded framework browser plugin (512). The method interceptor (504) checks the domain in the request against the whitelist and permits the API call to the application shell core (510) only if the domain in the request is a member of the whitelist. If not, the API call is blocked (returned). If so, the API request is allowed to process, perhaps accessing business logic (514). The business logic (514) may be part of the embedded web browser (502), or may be a processes external to and accessed by the embedded web browser (502).

Figure 6:
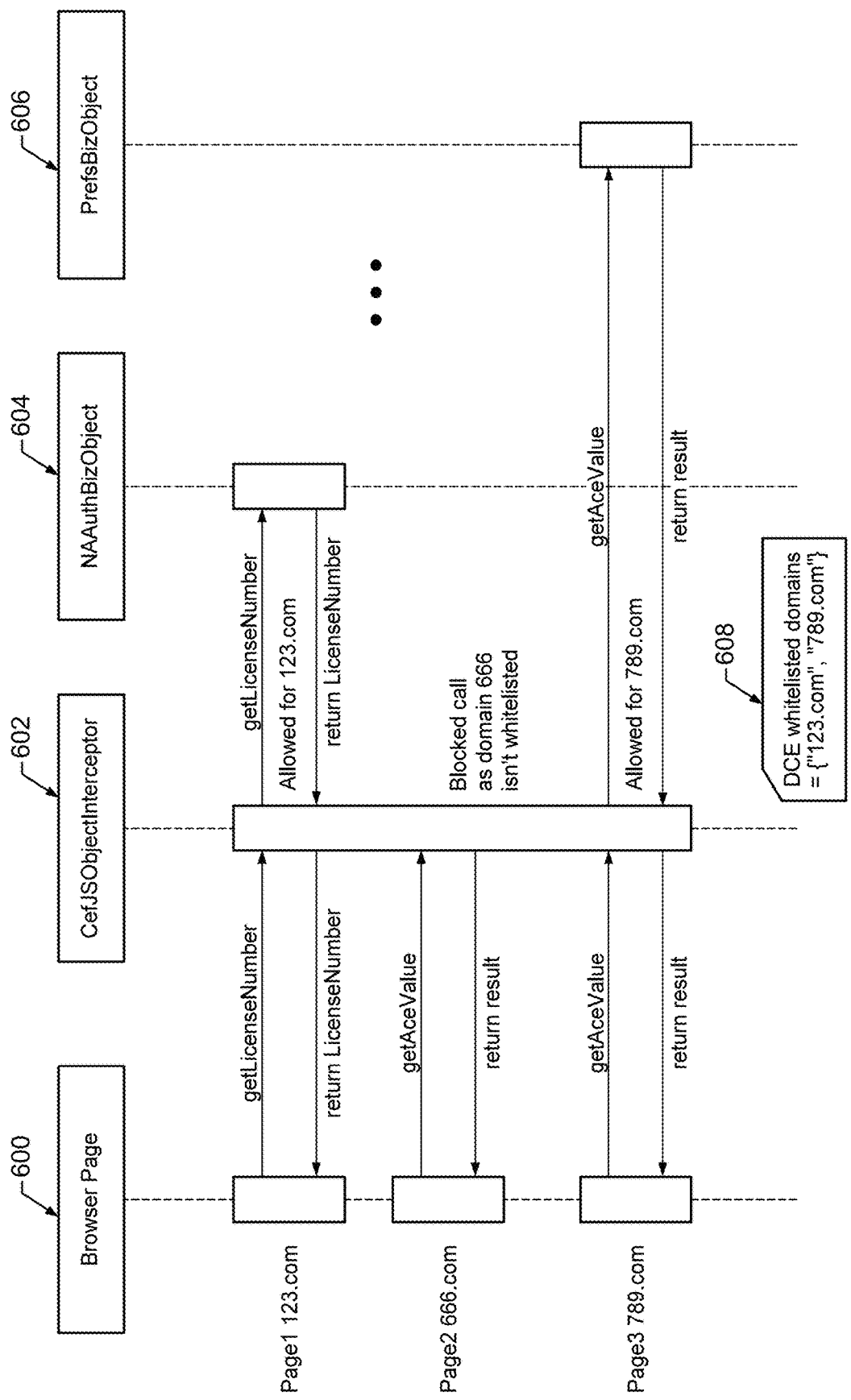
Figure 7:
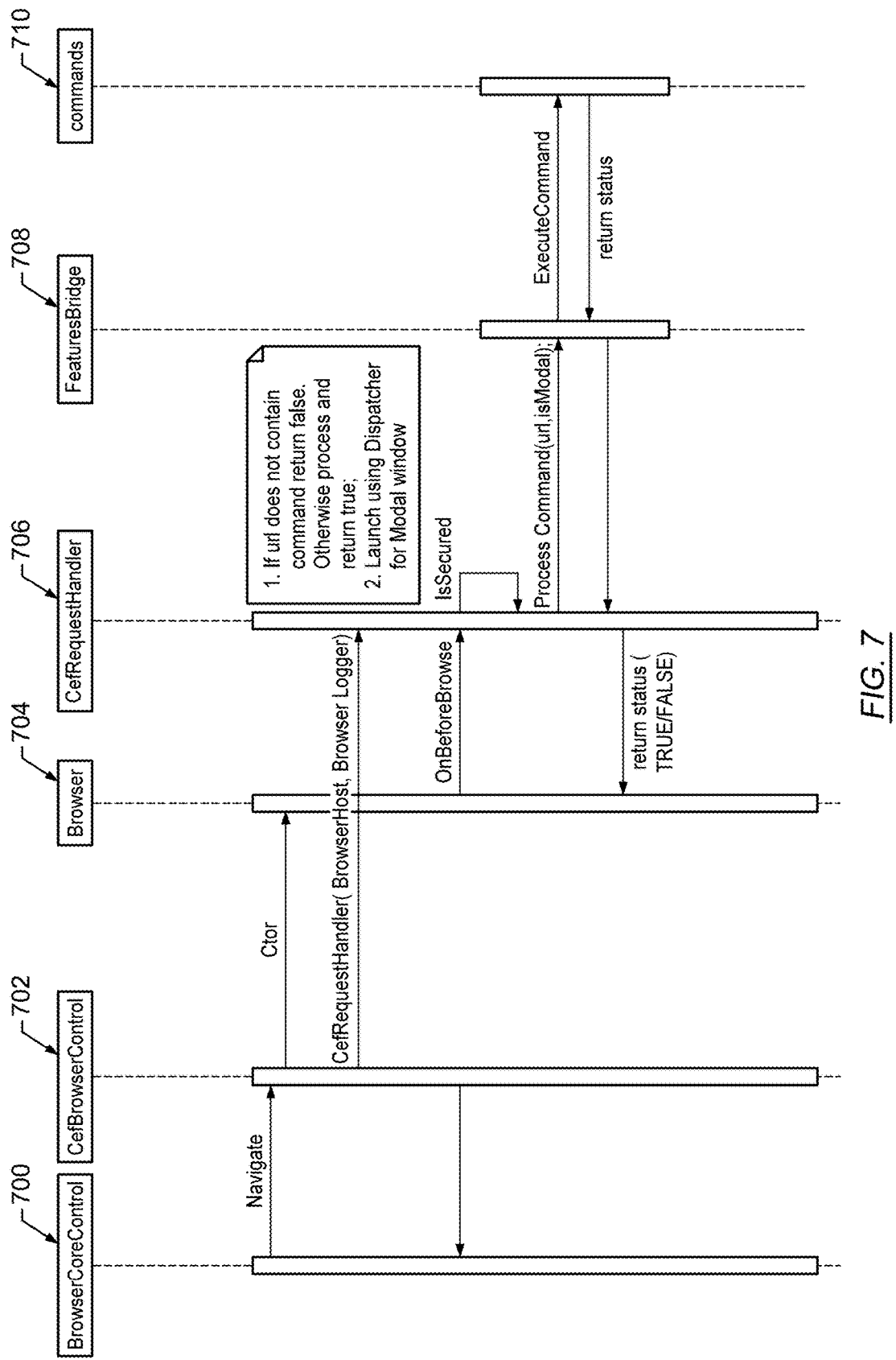

FIG. 6 and FIG. 7 show data flows for a secure embedded browser, in accordance with one or more embodiments. In FIG. 6, the browser page (600) is the page that transmits the request that includes the domain. The "CefJSObjectInterceptor" (602) is the method interceptor (126) of FIG. 1. "Cef" stands for "Chromium Embedded Framework." "JS" stands for JAVASCRIPT®. The object is target data which is specified in the request. The NAAAuthBizObject (604) and the he PrefsBizObject (606) are data objects that contains sensitive financial information.

A whitelist (608) is shown in FIG. 6. The whitelist (608) represents those domains for which the "CefJSObjectInterceptor" (602) will permit API calls.

Three examples are shown. For page 1 at "123.com," the "CefJSObjectInterceptor" (602) intercepts the request to get a license number. Because the domain 123.com is on the whitelist, the license is returned to the "CefJSObjectInterceptor" (602). The "CefJSObjectInterceptor" (602) in turn passes the license number to the browser page (600).

For page 2 at "666.com," a request to the PrefsBizObject (606) to return sensitive information (the "getAceValue" request shown in FIG. 6) is blocked by the "CefJSObjectInterceptor" (602). The request is blocked because the domain "666.com" is not on the whitelist (608).

In contrast, a similar call to retrieve the sensitive information to the PrefsBizObject (606) from 789.com is allowed. The domain "789.com" is on the whitelist (608). Thus, the "CefJSObjectInterceptor" (602) passes the API call to get the sensitive information (the "getAceValue" request to the PrefsBizObject (606)) The information is returned to the "CefJSObjectInterceptor" (602) and then passed to the browser page (600).

FIG. 7 shows another data flow sequence diagram, from the perspective of the embedded browser. A browser core control (700) transmits a request to navigate to a Chromium embedded framework browser control (702). The request is passed to the browser core (704). However, the request is also intercepted by the Chromium embedded framework request handler (706) (e.g., the method interceptor (126) of FIG. 1). If the request includes a whitelisted domain, then the request is passed to a features bridge (708) (e.g., the API) where the command is transmitted to an application (710) for execution. The output of the application is returned to the features bridge (708), back to the Chromium embedded framework request handler (706), and is then permitted to be used or displayed by the browser.

However, if the domain in the request is not on the whitelist, then the Chromium embedded framework request handler (706) blocks the API call to the features bridge (708). As a result, the call is returned to indicate that the call will not be honored.

FIG. 8 shows pseudocode for creating a secure browser, in accordance with one or more embodiments. The pseudocode (800) indicates how to program the features of the method interceptor (e.g., the method interceptor (126) of FIG. 1) into an embedded browser as an application plugin. Explanatory text (802) indicates the function(s) of each set of lines of pseudocode.

Figure 9:
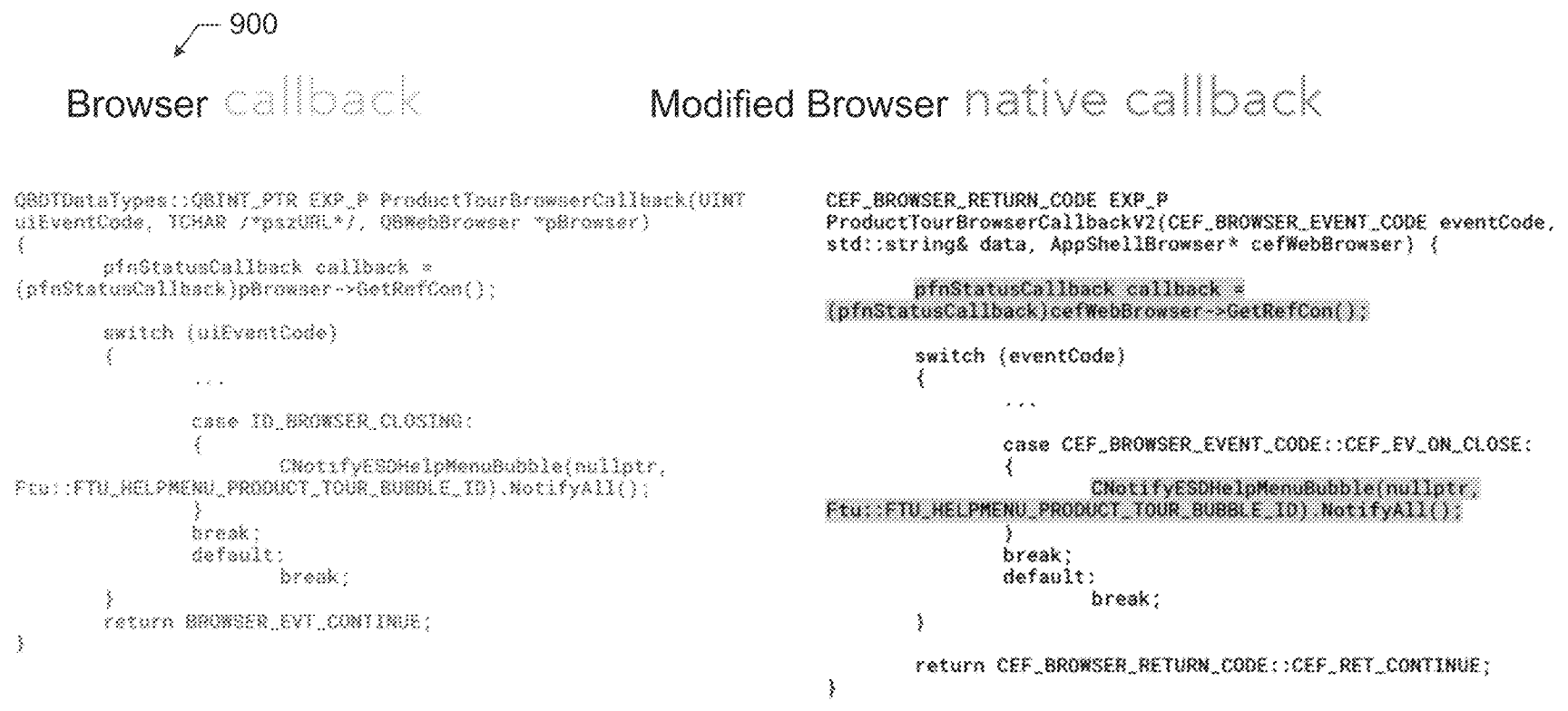

FIG. 9 shows an example of a native callback interrupting an API call, in accordance with one or more embodiments. Pseudocode (900) indicates the pseudocode executed when a request with a specified domain is submitted to an embedded browser without the method interceptor (e.g., the method interceptor (126) of FIG. 1). Pseudocode (902) indicates the pseudocode executed when a request with a specified domain is submitted to a modified embedded browser with the method interceptor. Thus, the pseudocode (902) is an example of an application plugin according to the one or more embodiments.

In summary, the one or more embodiments address the problem of insecure legacy embedded browsers using a CEFSharp (Chromium embedded framework C sharp programming language) method interceptor functionality. When a page is loaded, the URL is identified and the domain stored. When the page makes an API call to access application data through JAVASCRIPT®, the API is called using a custom method interceptor. The domain is checked. The call is honored or completed only if the domain is in the allowed list (e.g., a whitelist). If the domain is not in the allowed list, then the call is rejected and not transmitted to the target domain of the call. Alternatively, a disallow list (e.g., blacklist) may be used. The domain name list is dynamically configurable through a distributed computing environment (DCE). The one or more embodiments are useful for many applications that include CEF embedded browsers that otherwise do not have safeguards for object access.

The one or more embodiments provide for 1. Register for the page load event to keep track of the latest URL. 2. Register for method interceptor which gets called before the JAVASCRIPT® invokes the C #method. In the handler, logic is added that verifies if the page is from the supported domain. Logic is added to dynamically configure a domain list, if desirable.

As described above, technical security problem arises in embedded browsers, particularly embedded browsers that are based on legacy browsers. Legacy browsers are no longer supported or updated, making them vulnerable to malicious users. Some third party websites launched from a legacy embedded browser may be stopped by the third party due to security concerns.

Some applications or embedded brewers may have pages that use legacy drivers to interact with the application. However, legacy drivers may not be supported in modern browsers. As a result, there may be excessive use of commands in an embedded browser for Modal/MDI (multiple document interface) windows.

Legacy browsers and drivers may be not only inefficient, but also may be more vulnerable to security breaches. However, switching to a new embedded browser may be impractical, because the embedded browser is already integrated with the application. As a result, a browser may be insecure.

Thus, the one or more embodiments may be used to build a browser framework (i.e., a plugin) on top of the existing (off-the-shelf) framework. The modified browser may be further modified if desired. For example, if the embedded browser may be upgraded by upgrading CEF, allowing changes in a single place to be enough for both generic browser and App Shell plugins. Development tool integration through a distributed computing environment can be utilized by a generic browser as well.

The one or more embodiments include a CEF based browser with a variety of browser UI (user interface) controls such as a navigation bar, an address bar, a status bar, a download bar, a padlock, view site certificate, etc., in a dynamically configurable way by a client. The UI experience is similar to an external browser, but more secure.

The one or more embodiments provide for a browser plugin with necessary business objects for fetching information from an application or from an embedded browser. A plugin prevents developers from having to create a new plugin every time for any new use case supported. The one or more embodiments provide backward compatibility for ActiveX calls by dynamically injecting an ActiveX wrapper class before the page loads, which allows the existing web page to work seamlessly without any web page change.

The one or more embodiments provide support for ActiveX or two-way communication. An ActiveX object is used to create instances of OLE automation objects in a native browser. An example of an ActiveX object usage in an embedded browser is:

```
var obj = new ActiveXObject("QB.CoLocator");
var myQBPrefs = obj.Create("QBPrefs.Preferences");
function IsPayrollEnabled( )
{
  if (myQBPrefs.PayrollState == 0) {
    return 'FALSE';
  }
  else {
    return 'TRUE';
  }
}
```

Attention is now turned to security enhancements. The browser has multiple data channels exposed to webpages, including ActiveXObject calls, <object> tag bindings, and links such as native application commands. Data access is allowed in one or more embodiments for reading/writing preferences, license details, and opening windows. In at least some embodiments, no restriction is imposed on downloaded files from an embedded browser, as the security domain described below ensures that only trustworthy sources are accessed.

The one or more embodiments establish boundaries for data object access, links, and downloads. The one or more embodiments provide for the ability to track domains across multiple page redirects. CEF Browser Plugin pages are configured with a secure domain list. A list can be updated using a DCE. Local pages are disabled for ActiveXObject access by default. The one or more embodiments provide for the ability to bypass checks for local plugin development using a "DefaultAllowQBResourceAccess" flag.

The one or more embodiments have several benefits. In one or more embodiments, no new application shell plugin classes is created. The one or more embodiments have the ability to pass custom data objects/pointers for taking relevant actions. The one or more embodiments work with Modal and MDI (multiple document interface) workflows. The platform handles native callback memory clean-ups.

The one or more embodiments permit the migration of legacy browser pages using simpler callback procedures with ease. The one or more embodiments may provide for an extensible platform for native callback customizations. Most of the solution developed for generic browser can be leveraged for an application shell Plugin. An existing browser command may be used to launch a CEF browser to reduce client code changes. For example, a parameter such as 'type=AppShellBrowser' may be added to a browser to make a page launch in the CEF browser. An example of such a parameter may be as follows: Example: qbw: browser?url=product.com/billpay&unique=y&modal=y&HideURL=y&Height=300&Width=490&type=AppShellBrowser.

The one or more embodiments thus increase the security of objects inside an embedded browser. The embedded browser is used to retrieve data used by the application itself. The one or more embodiments accomplish whitelisting of domains through object access. The one or more embodiments also check SSL (secure socket layer) and HTTPS (hypertext transfer protocol, secured) resources before checking against whitelisted URLs.

As used herein, a computer is an electronic device, not necessarily limited to a desktop computer or a server. Thus, a computer may be a mobile phone, a smartwatch, a laptop computer, a desktop computer, a server computer, etc. A "computer" may also refer to multiple computers, possibly in a distributed computing or networked environment, and possibly acting in tandem. The terms "computer" and "computing system" may be used synonymously.

Figure 10A:
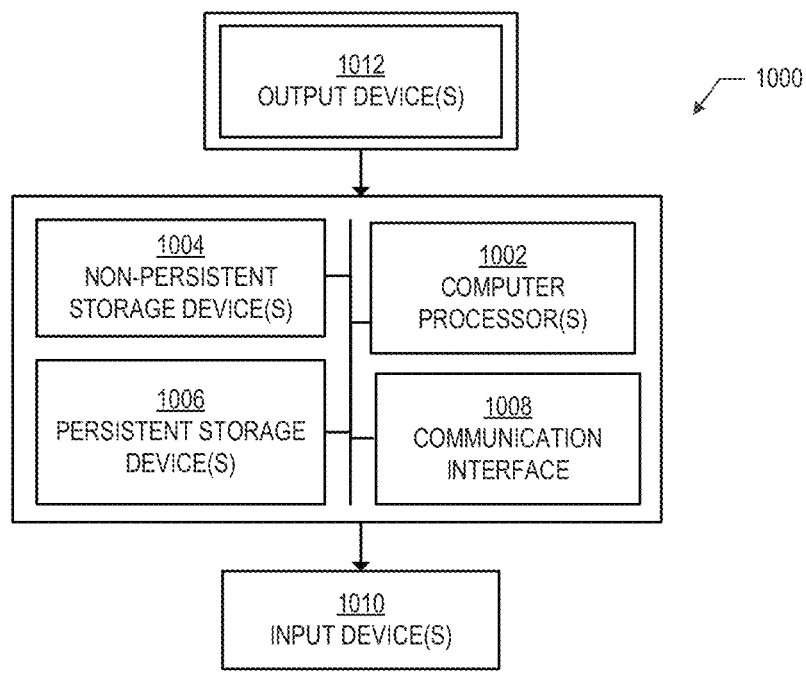
FIG. 10A and FIG. 10B show a computing system and network environment, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processors (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. For example, the computer processor(s) may be one or more cores or micro-cores of a processor. The input devices (1010) may include a touchscreen, keyboard, mouse, microphone, touchpad, electronic pen, or any other type of input device. The communication interface (1012) may include an integrated circuit for connecting the computing system (1000) to a network (not shown) (e.g., a local area network (LAN), a wide area network (WAN) such as the Internet, mobile network, or any other type of network) or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 10B:
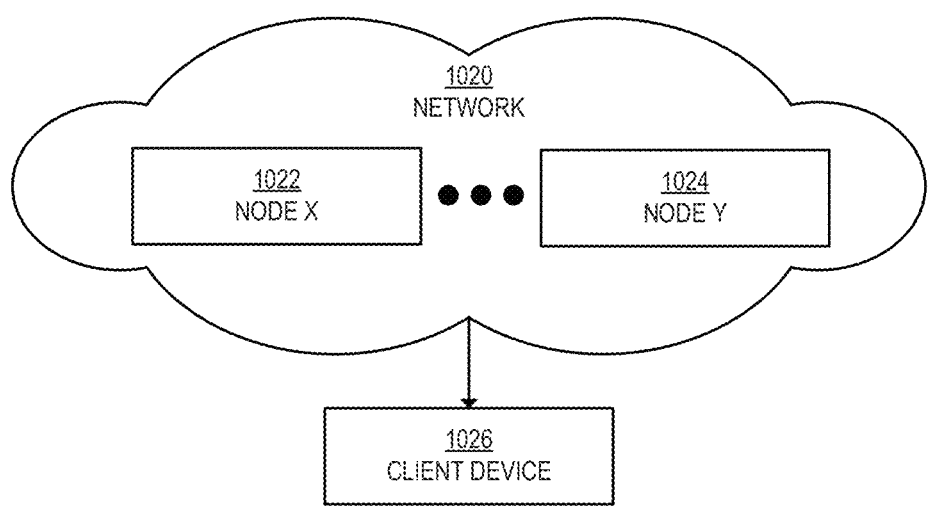

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A. Alternatively, a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include or perform all or a portion of one or more embodiments.

The computing system of FIG. 10A may include functionality to present raw or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, a computer is an electronic device, not necessarily limited to a desktop computer or a server. Thus, a computer may be a mobile phone, a smart watch, a laptop computer, a desktop computer, a server computer, etc.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities.

In the above description, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope as disclosed herein. Accordingly, the scope should be limited only by the attached claims.

What is claimed is:

1. A method comprising:
   receiving, at an embedded browser embedded in an application, a first request to load a browser page designated by a uniform resource locator (URL);
   loading, by the embedded browser, the browser page;
   storing a domain specified by the URL;
   receiving, at the embedded browser, a second request to access data designated by the URL;
   routing automatically, by the embedded browser, the second request to a method interceptor,
   intercepting, by the method interceptor, the second request comprising an application programming interface (API) call to access the data designated by the URL,
      wherein intercepting further comprises calling the method interceptor before an execution controller calls an API to execute the API call, wherein the method interceptor comprises an application plugin of the embedded browser,
and
wherein the API call is performable by an API of the embedded browser;
pausing, by the method interceptor, the passing of the API call to the API;
disabling, by the method interceptor, a local page for object access;
wrapping, by the method interceptor, the embedded browser as a shell;
comparing, by the method interceptor, the domain specified by the URL to a list of allowed domains and a list of disallowed domains;
blocking, by the method interceptor and responsive to the domain failing to be a member of the list of allowed domains, the API call,
wherein blocking is performed by the method interceptor preventing the API call from passing to the API;
returning, by the method interceptor, the second request to an additional program;
tracking, by the additional program, a plurality of page redirects to determine a source domain of the second request;
isolating, by the additional program, the source domain of the second request;
blocking the source domain; and
updating the list of disallowed domains to include the source domain.

2. The method of claim 1, further comprising
receiving, at the embedded browser, a third request to access second data designated by a second URL specified in the third request;
intercepting, by the method interceptor, a second API call to access the second data designated by the second URL;
comparing, by the method interceptor, a second domain specified by the second URL to the list of allowed domains; and
passing, by the method interceptor and responsive to the second domain being a member of the list of allowed domains, the second API call to the API.

3. The method of claim 2, further comprising:
executing, by the API, the second API call;
retrieving, by the embedded browser, the second data; and
returning, by the embedded browser, the second data.

4. The method of claim 2, further comprising:
calling, by the API and responsive to passing the second API call, execution of the application; and
generating, by the application and using the data designated by the URL, an output.

5. The method of claim 4, further comprising:
displaying, via the embedded browser, the output on a display screen in communication with the embedded browser.

6. The method of claim 4, further comprising:
transmitting, via the embedded browser, the output to an external program external to the embedded browser and external to the application.

7. The method of claim 1, further comprising:
registering a page load event to track the URL.

8. The method of claim 1, wherein intercepting the API call comprises:
calling the method interceptor before an execution controller calls the API.

9. A method comprising:
receiving, at an embedded browser embedded in an application, a first request to load a browser page designated by a uniform resource locator (URL);
loading, by the embedded browser, the browser page;
storing a domain specified by the URL;
receiving, at the embedded browser, a second request to access data designated by the URL;
routing automatically, by the embedded browser, the second request to a method interceptor,
intercepting, by the method interceptor, the second request comprising an application programming interface (API) call to access the data designated by the URL,
wherein intercepting further comprises calling the method interceptor before an execution controller calls an API to execute the API call,
wherein the method interceptor comprises an application plugin of the embedded browser,
and
wherein the API call is performable by an API of the embedded browser;
pausing, by the method interceptor, the passing of the API call to the API;
disabling, by the method interceptor, a local page for object access;
wrapping, by the method interceptor, the embedded browser as a shell;
comparing, by the method interceptor, the domain specified by the URL to a list of allowed domains and a list of disallowed domains;
passing, by the method interceptor and responsive to the domain being a member of the list of allowed domains, the API call to the API;
receiving, at the embedded browser, a third request to access second data designated by a second URL specified in the third request;
intercepting, by the method interceptor, a second API call to access the second data designated by the second URL;
comparing, by the method interceptor, a second domain specified by the second URL to the list of allowed domains and the list of disallowed claims;
blocking, by the method interceptor and responsive to the second domain failing to be a member of the list of allowed domains, the second API call,
wherein blocking is performed by the method interceptor preventing the second API call from passing to the API;
tracking, by an additional program, a plurality of page redirects to determine a source domain of the third request; and
updating, by the additional program, the list of disallowed domains to include the source domain of the third request.

10. The method of claim 9, further comprising:
executing, by the API, the API call;
retrieving, by the embedded browser, the data; and
returning, by the embedded browser, the data.

11. The method of claim 9, further comprising:
calling, by the API and responsive to passing the API call, execution of the application; and
generating, by the application and using the data designated by the URL, an output.

12. The method of claim 11, further comprising:
displaying, via the embedded browser, the output on a display screen in communication with the embedded browser.

13. The method of claim 11, further comprising:
transmitting, via the embedded browser, the output to an external program external to the embedded browser and external to the application.

14. The method of claim 9, further comprising:
registering a page load event to track the URL.

15. The method of claim 9, wherein intercepting the API call comprises:
calling the method interceptor before an execution controller calls the API.

16. A system comprising:
a processor;
a data repository in communication with the processor and storing:
  a first request received from an external computing device,
  a second request having an application programming interface (API) call;
  a browser page,
  data,
  a uniform resource locator (URL) specified by the first request,
  a domain of the URL,
  the API call,
  a local page,
  a list of allowed domains, and
  a list of disallowed domains;
an application executable by the processor;
an additional program; and
an embedded browser embedded in the application, the embedded browser configured to:
  receive a first request to load the browser page designated by the URL,
  loading the browser page,
  store the domain specified by the URL, and
  receive a second request to access the data designated by the URL, and wherein the embedded browser comprises:
    an API programmed to execute the API call or pass the API call to the application, and
    a method interceptor programmed to:
      intercept the second request comprising the API call prior to executing the API call or passing the API call to the application,
      wherein intercepting further comprises calling the method interceptor before an execution controller calls the API, and
      wherein the method interceptor comprises an application plugin of the embedded browser,
    pause the passing of the API call to the API,
    disable the local page for object access,
    wrap the embedded browser as a shell,
    compare the domain to the list of allowed domains and the list of disallowed domains,
    block, responsive to the domain failing to be a member of the list of allowed domains, the API call from executing or from passing to the application, and
    return the second request to an additional program,
  wherein the additional program is programmed to:
    receive the second request from the method interceptor, track a plurality of page redirects to determine a source domain of the second request,
    isolate the source domain of the second request,
    block the source domain, and
    update the list of disallowed domains to include the source domain.

17. The system of claim 16, wherein the application is configured, when executed by the processor, to use the data returned by executing the API call, and wherein the system further comprises:
a display device configured to display an output of the application.

* * * * *